United States Patent [19]
Carter et al.

[11] 3,859,159
[45] Jan. 7, 1975

[54] APPARATUS FOR FORMING A RUPTURABLE SEAL

[75] Inventors: Elbert P. Carter, Wilmington; Gerrit Nieuweboer, Claymont, both of Del.

[73] Assignee: E. I. du Pont de Nemours and Company, Wilmington, Del.

[22] Filed: Mar. 4, 1974

[21] Appl. No.: 447,872

Related U.S. Application Data

[63] Continuation-in-part of Ser. No. 204,418, Dec. 3, 1971, abandoned.

[52] U.S. Cl................ 156/581, 156/290, 156/306, 156/553, 156/583
[51] Int. Cl...................... B30b 15/34, B32b 31/00
[58] Field of Search ........... 156/290, 306, 380, 553, 156/581, 583

[56] References Cited
UNITED STATES PATENTS
2,714,416   8/1955   Fener................................. 156/583

Primary Examiner—William A. Powell

[57] ABSTRACT

Disclosed herein is a method and apparatus for forming uniform and reliable rupturable seals between two thermoplastic surfaces by the use of compression and impulse heating.

8 Claims, 4 Drawing Figures

PATENTED JAN 7 1975

INVENTORS
ELBERT P. CARTER
GERRIT NIEUWEBOER

BY

ATTORNEY

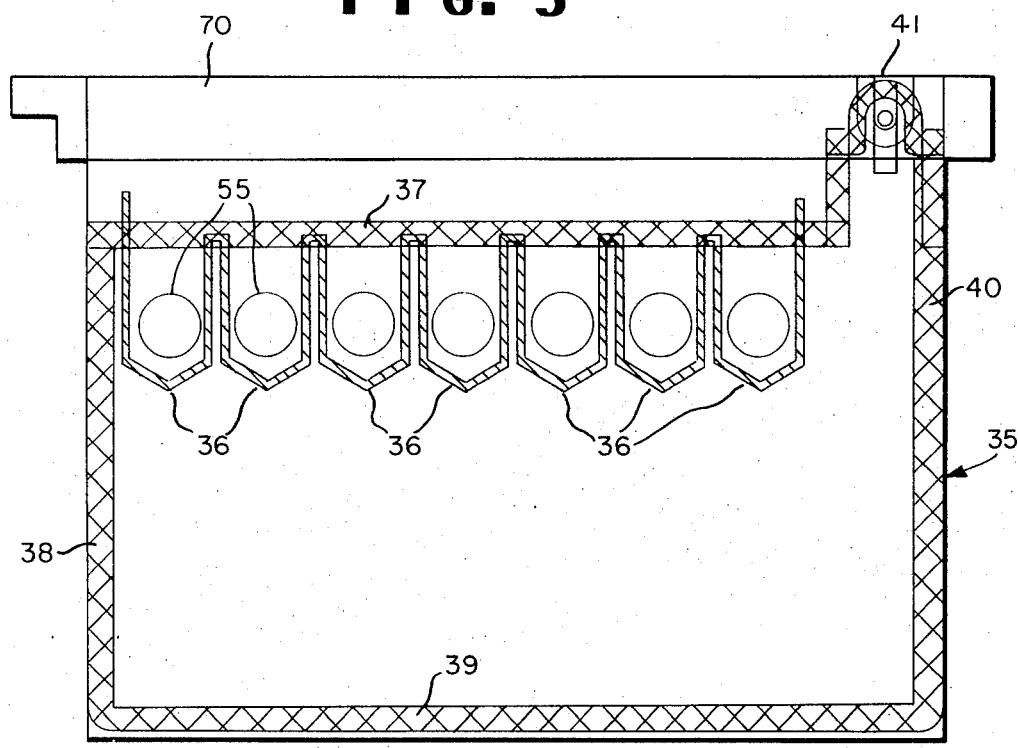

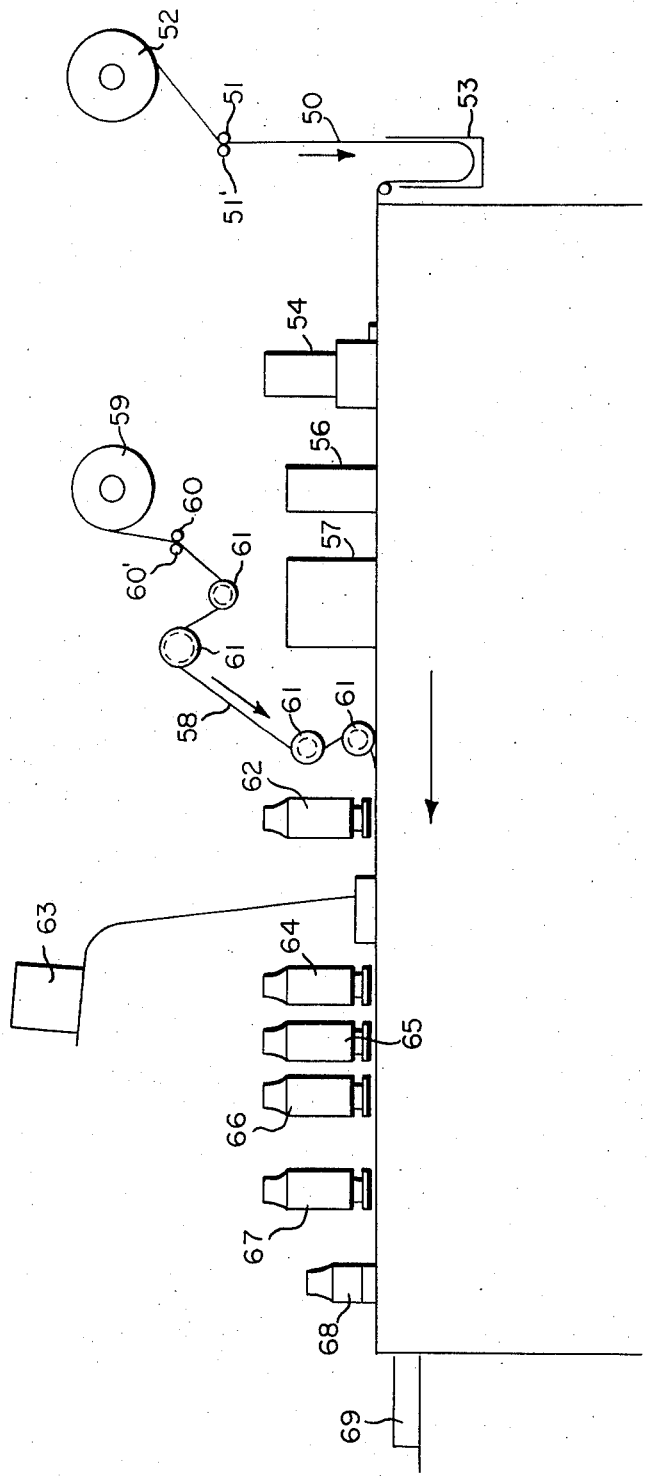

APPARATUS FOR FORMING A RUPTURABLE SEAL

CROSS REFERENCE TO RELATED APPLICATIONS

This application is a continuation-in-part of U.S. Patent Application Ser. No. 204,418 filed on Dec. 3, 1971, now abandoned.

BACKGROUND OF THE INVENTION

This invention relates generally to a process and apparatus for forming rupturable seals between thermoplastic surfaces, particularly seals that will rupture reliably and uniformly upon the application of a given force to the seals.

The growth of the prepackaging industry has led to a proliferation in the art relating to the formation of both permanent and temporary seals between theremoplastic surfaces. In the formation of such seals, especially those which are made by the application of heat and pressure without the use of adhesive materials, the art, however, still leaves a great deal to be desired. In particular, while it is comparatively easy to tack two thermoplastic surfaces together by the formation of a bond that is easily destroyed, it is quite difficult to form a true seal which is strong enough to withstand substantial abuse and yet which is rupturable in the sense that it has a bond strength considerably less than the maximum bond strength possible between the surfaces. The problem is particularly acute in those thermoplastic structures containing both permanent and rupturable seals, because in such cases it is difficult to form a true seal which can be ruptured reliably and uniformly without rupturing the permanent seals. It is generally believed, in fact, that any attempt to produce differential heat seals by pressing two surfaces directly together at temperatures or pressure lower than that required to produce a permanent seal, invariably results in either a strong seal which cannot be readily broken or in a weak seal which is incapable of maintaining the desired separation between the compartments formed by the seal, even though accurate control of temperature, pressure and time can be achieved. See, for example, U.S. Pat. No. 2,932,385 for a Multi-Compartment Package with Internal Breaker Strip which issued on Apr. 12, 1960 to E. W. Bollmeier et al.

We have found that this statement is not true; but it does represent the confusion that has existed in the state of the art from the 1960's up to the present time. This confusion is further represented by the variety of devices that have been proposed to overcome the supposed difficulty in forming non-permanent seals by a simple heat and pressure technique. For example, in U.S. Pat. No. 3,156,354 for a Multi-Compartment Package which issued on Nov. 10, 1964 to L. J. Hayhurst, the strength of the seals is controlled by controlling the relative areas of the permanent and nonpermanent seals. In U.S. Pat. No. 2,916,886 for a Unit Type Chemical Freezing Package, which issued on Dec. 15, 1959 to A. A. Robins, a sharp mechanical plunger is incorporated into each package to aid in rupturing the temporary seal. In U.S. Pat. No. 3,028,000, which issued on Apr. 3, 1962 to J. E. Clements et al, the strength of the non-permanent seal is adjusted by interspersing weak and strong sections along the extent of the rupturable seal. Finally, in U.S. Pat. No. 3,429,429 for a Compartmented Package, which issued on Feb. 25, 1969 to E. J. Poitras, rather than rupture the seal forming the compartment, the material itself is ruptured by propagating a tear from a notch in the seal.

It is an object of this invention, therefore, to provide a method and apparatus for forming a true rupturable seal between thermoplastic surfaces, without necessitating the use of adhesive materials between the surfaces or the use of mechanical devices associated with the seal. It is a further object of the present invention to provide a method and apparatus for producing a plurality of seals which will rupture reliably and uniformly upon the application of a given force. It is a still further object of the present invention to provide a method and apparatus for forming a multi-compartmented container formed by permanently sealing two thermoplastic surfaces together, in which the compartments are separated by rupturable seals having a bond strength considerably less than the bond strength of the permanent seals so that, when a force is applied to the container, the rupturable seals will rupture without disrupting the permanent seals.

SUMMARY OF THE INVENTION

These objects and others are accomplished by a method which comprises
  a. bringing together two thermoplastic surfaces;
  b. compressing the thermoplastic surfaces between a resilient backing plate and a heating platen having at least one raised electrically conductive heating surface in the shape of the desired rupturable seals;
  c. while the thermoplastic surfaces are compressed between the heating platen and said backing plate, rapidly raising each region of the thermoplastic surfaces representing the rupturable seals to equal temperatures, sufficient to bond the thermoplastic surfaces together with a bond strength considerably less than the maximum bond strength possible between them, by controlling the power supplied to each region of the heating surface representing a rupturable seal; and
  d. while the thermoplastic surfaces are still compressed between the heating platen and the backing plate, allowing the thermoplastic surfaces to cool. When used to form a multi-compartmented container in which the compartments are separated from one another by rupturable seals, the method further comprises forming a larger compartment surrounding the rupturable seals by sealing said thermoplastic surfaces together to form a bond having a bond strength considerably greater than that of the rupturable seals.

These methods can be accomplished by using an apparatus comprising a resilient backing plate, a heating platen and a means for compressing the thermoplastic surfaces between the backing plate and the heating platen in which the heating platen comprises
  a. a metal plate;
  b. means to maintain the metal plate at a constant temperature;
  c. a thermally conductive electrical insulating film bonded to the metal plate;
  d. at least one raised electrically conductive heating surface bonded to the insulating film and having the shape of the desired rupturable seals;
  e. a thermally conductive, non-stick film disposed over the heating surface; and f. means to separately control the power supplied to each region of said heating surface defining one of the rupturable seals.

In the preferred embodiment, both thermally conductive films are polyimide films such as those sold under the tradename Kapton by the E. I. du Pont de Nemours and Company; the electrically conductive heating surface is an invar heating surface, having at least one chevron-shaped region, bonded to the thermally conductive electrically insulating film by means of a tetrafluoroethylene-hexafluoropropylene copolymer film; and the thermally conductive non-stick film also comprises a polyimide film coated on the side away from the heating surface, with a tetrafluoroethylene-hexafluoropropylene copolymer film.

It is the compression of those portions of the thermoplastic surfaces which make up the rupturable seals, followed by the rapid heating of those regions to a temperature which will allow the formation of the bond, followed finally by continued compression of the thermoplastic surface during the cooling, that forms the reliable, uniform rupturable seal. Such heating is usually referred to as impulse heating. The temperature used in the process is critical. It depends to a certain extent on the pressure used to compress the thermoplastic surfaces. There will naturally be a pressure, readily apparent to those skilled in the art, at which no seal can be formed. Above this pressure, however, there will be a critical temperature, which will vary with the pressure used, for the formation of the seal. A variation of about 1% in the power used to heat the electrically conductive heating surface will vary the temperature enough to determine empirically whether or not a good rupturable seal will form. The proper temperature will vary with the particular thermoplastic materials used, and must be determined for each material, but once the proper temperature has been found, that temperature and pressure will invariably produce uniform rupturable seals. Control of the temperature is so critical that is is difficult to form the heating surface by the use of mechanical or chemical means so that the resistance of the surface is uniform to the degree required. For this reason the preferred process is to separately control the electrical power supplied to each region of the heating surface which defines a rupturable seal by using individual power control devices for each region.

BRIEF DESCRIPTION OF THE DRAWINGS

These and other features of the invention can best be described by reference to the following figures in which:

FIG. 3 is a diagram of a multi-compartmented container illustrating the relative position of the rupturable and permanent seals.

FIG. 4 is a schematic diagram of an automatic pack making apparatus utilizing the present invention.

DETAILED DESCRIPTION OF THE DRAWINGS

Figure 1:
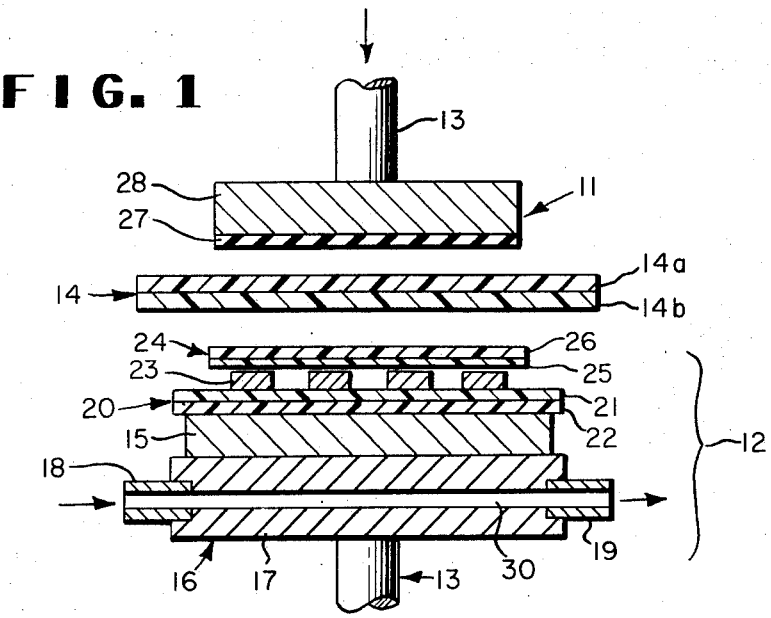
FIG. 1 is a schematic diagram of the heating platen used in the present invention showing the composite structure of the heating platen.

FIG. 1 illustrates, schematically, an apparatus for forming a rupturable seal between two thermoplastic surfaces 14a and 14b. The apparatus comprises a resilient backing plate 11, a heating platen 12, and some means, represented schematically by pistons 13, for compressing the thermoplastic surfaces between the backing plate and heating platen.

The method and apparatus disclosed herein is useful in the formation of rupturable seals between any surface made from thermoplastic materials, but it is particularly useful in forming such seals between similar thermoplastic surfaces, especially those made from ionomeric resins such as those sold under the tradename Surlyn A by the E. I. du Pont de Nemours and Company. The term surface, in this context, means a film or any malleable structure having at least one thermoplastic surface. The two surfaces can either be regions of two separate films or different regions of the same film folded back on itself. The surfaces can be surfaces which are composites of thermoplastic materials and some other malleable material such as a film of metal or some other plastic material. The only criterion is that the surfaces between which the bond is formed are thermoplastic and that the entire structure is malleable enough so that some compression between the backing plate and heating platen is possible.

Figure 2:
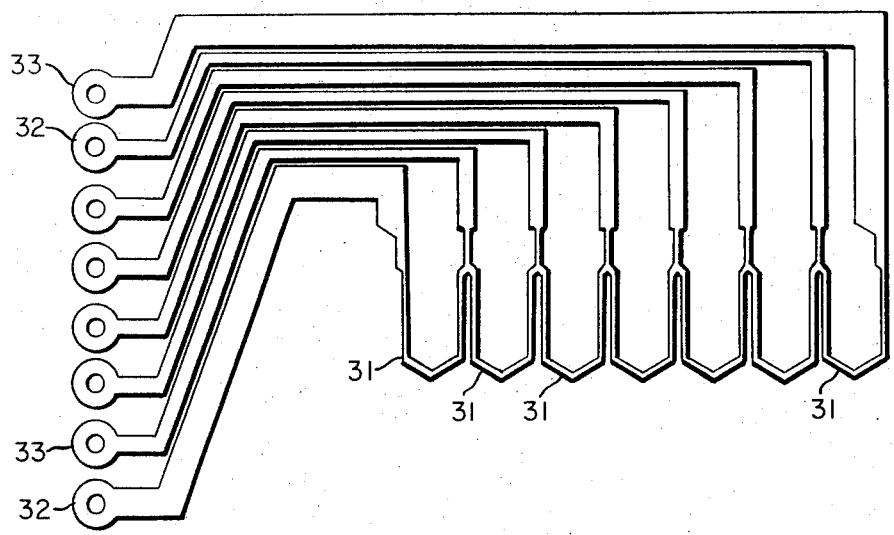
FIG. 2 is a diagram of the raised heating surface showing the chevron-shape of the rupturable seal and the means to separately control the current supplied to each region.

The heating platen comprises a plate made from some suitable metal such as copper, aluminum or stainless steel. It should be rigid and have a high thermal conductivity. Some means 16 to maintain the metal plate at a constant temperature is also provided. In the embodiment shown, this constant temperature means comprises a metal cooling plate 17, provided with conduit 30 and an inlet and outlet means, 18 and 19 respectively, for introducing water at a constant temperature into the metal block. The constant temperature should be designed to maintain metal block 15 at a temperature considerably below the temperature to which the heating surface will be raised. A constant temperature of between room temperature to about 60°C. should be sufficient. Although a water cooled means is indicated in the drawing, any means capable of maintaining the temperature of metal plate 15 at the desired level, such as a flow of cool air, will be sufficient. The heating platen further comprises a thermally conductive electrically insulating film 20 bonded to a metal plate 15. In the embodiment shown, this thermally conductive electrically insulating film comprises a thin Kapton polyimide film 21 bonded to the metal plate 15 and covered by a thin film of tetrafluoroethylene-hexafluoropropylene copolymer 22, which is provided for the purpose of bonding at least one raised electrically conductive heating surface 23 to the thermally conductive electrically insulating film. To provide the proper distribution of pressure, or embossing, these heating surfaces should be at least 5 mils thick preferably 7 mils thick. Furthermore, the thermally conductive electrical insulating film should be designed so that raised heating surface is in thermal contact with the metal plate 15 and yet is electrically insulated from it. As shown in FIG. 2, the heating surface can comprise one or more chevron-shaped regions 31, each with its own electrical leads 32 and 33 so that the power supplied to each region of the heating surface defining one of the rupturable seals can be controlled separately.

Since the raised heating surfaces have a tendency to stick to the thermoplastic surfaces, the apparatus shown in FIG. 1 is further provided with a thermally conductive, non-stick film deposited over the heating surface. This film should be constructed so that the heat developed by the heating surfaces will be transmitted essentially undistorted to the thermoplastic surfaces and yet it must have a surface which will not stick to the thermoplastic surfaces, In the embodiment shown, this thermally conductive non-stick film comprises a thin layer of Kapton polyimide film 25, coated with a tetrafluoroethylene-hexafluoropropylene copolymer film 26. It has been found that it is best to place the thermally conductive non-stick film on top of the heating surfaces and not to bond the films to the heating surface. The reason for this is that any adhesive used to bond the thermally conductive non-stick film to the raised heating surface has a tendency to spread over a period of time to dissipate or at least distort the flow of heat energy transferred to the thermoplastic surface.

Finally in the embodiment shown, the resilient backing plate comprises a thin layer of resilient material such as rubber or neoprene 27 bonded to a metal platen 28. In operation the thermoplastic surfaces are compressed between the resilient backing plate and the heating platen so that a pattern in the shape of the desired rupturable seals is embossed on the thermoplastic sheets. While the sheets are still compressed between the backing plate and the heating platen, the temperature of the thermoplastic materials in the region of the rupturable seals is raised to the proper level by applying electrical power to the electrically conductive raised heating surface. To insure that each one of the rupturable seals is raised to the same temperature the power supplied to each region of the raised heating surface which defines the rupturable seals is controlled separately. This power is applied for a time sufficient to raise the thermoplastic sheets to the proper temperature and then the electrical power to the raised heating surface is cut off. Due to the action of the constant temperature plate 16, the entire heating platen is rapidly cooled to the given constant temperature. Once this has happened the thermoplastic sheets are released and the rupturable seals have been formed.

To form a multi-compartmented container such as that shown in FIG. 3, after the rupturable seals 36 have been formed, permanent seals 37, 38, 39 and 40 are then formed by conventional methods. Naturally, the permanent seals can be formed first if desired. The multi-compartmented container 35 can be used for a variety of purposes. One such purpose is as an analytic test pack formed by prepackaging reagents in dimples 55 contained in the compartments surrounded by rupturable seals 36. By introducing a sample fluid through the opening 41 in header 70, the container can be used as a disposable test pack in which chemical analysis can be performed by rupturing one or all of the rupturable seals 36 at various times to produce the desired reaction.

FIG. 4 is a schematic diagram of an automatic pack making machine designed to manufacture multicompartment analytic test packs such as shown in FIG. 3 and further described in U.S. Pat. No. 3,476,515, the disclosure of which is hereby incorporated into this specification. The packs are made from two layers of film. The lower film 50 is fed by drive rolls 51, 51' from a lower film roll 52. After passing through a film tension box 53 the lower film is fed to a dimple press 54 which forms dimples 55 in the film. A tablet feeder 56, and a liquid feeder 57 are then used to deposit solid or liquid reagents into the dimples formed in the lower film. The upper film 58 is fed from an upper film roll 59 by drive rolls 60, 60', over various guide rolls 61, to a position over the lower film. The two films then pass through the temporary seal station 62 when the temporary seals 36 shown in FIG. 3 are made using the heating platens shown in FIG. 1. A header 70, or support for the pack, is then fed from a magazine 63 and positioned on the films at station 71. The header is then sealed to the film and the permanent seals 35, 37, 38 and 39 are made using heat sealing stations 64, 65, 66, and 67. The individual packs are then separated from the continuous film strip at a cutting station 68 and fed into a product tray 69.

In operation, two Surlyn A Type 1601 films are fed to the automated pack making apparatus. The upper film has a thickness of from about 3 to about 6 mils and the lower film has a thickness of about 3 to about 10 mils. The amount of energy used to achieve a specific peel strength will vary with the thickness of the upper layer but variations in the thickness of the lower layer have little effect on the energy needed to produce a specific peel strength. To form the rupturable seal, a platen pressure from about 50 to about 100 psi, preferably 60 psi is applied. Approximately 65 watts (5 amps at 13 volts through 2.6 ohms) is applied for 0.7 to 4.0 seconds, preferably 2.0 seconds. By controlling the energy pulse, peel strength can be varied from 0 to over 400 gms/seal. A range of 65 to 125 gms/seal is preferred and at over 400 gms/seal, the seal is considered to be permanent. In this context, gms/seal is the force in grams required to rupture a chevron-shaped seal by peeling apart the thermoplastic surfaces at an angle of 180° relative to each other so that the apex of the chevron is the first portion to rupture. For this test the width of the sealed line is 0.030 inch, the chevron includes an angle of 120°, and the center-to-center distance between the vertical legs is 0.46 inch. The force to rupture is the highest value in grams recorded between initiation of fupture and the point where the thermoplastic surfaces have been peeled apart for a distance of about 0.375 inch up the vertical legs of the seal.

What is claimed:

1. An apparatus for forming rupturable seals between two thermoplastic surfaces comprising a resilient backing plate, a heating platen and a means for compressing said thermoplastic surfaces between said backing plate and heating platen; said heating platen comprising:
   a. a metal plate,
   b. means to maintain said metal plate at a constant temperature,
   c. thermally conductive electrical insulating film bonded to said metal plate,
   d. at least one raised electrically conductive heating surface bonded to said insulating film and having the shape of the desired rupturable seals,
   e. a thermally conductive, non-stick film disposed over said heating surface; and
   f. means to separately control the power supplied to each region of said heating surface defining one of said rupturable seals.

2. The apparatus of claim 1 wherein said thermally conductive electrical insulating film is a polyimide film.

3. The apparatus of claim 1 wherein both thermally conductive films are polyimide films.

4. The apparatus of claim 3 wherein said electrically conductive heating surface is an invar heating surface bonded to said thermally conductive electrical insulating film by means of a tetrafluoroethylene-hexafluoropropylene copolymer film.

5. The apparatus of claim 3 wherein said electrically conductive heating surface has a thickness of at least 5.0 mils.

6. The apparatus of claim 3 wherein said thermally conductive non-stick film comprises a polyimide film coated on the side away from said heating surface with a tetrafluoroethylene-hexafluoropropylene copolymer film.

7. The apparatus of claim 3 wherein said heating surface comprises at least one chevron-shaped region.

8. The apparatus of claim 1 wherein said thermoplastic surfaces are made from an ionomeric resin.

* * * * *